UNITED STATES PATENT OFFICE 2,558,675

N-ACYL POLYIMIDES OF POLYCARBOXYLIC ACIDS

Paul J. Flory, Ithaca, N. Y., assignor to Wingfoot Corporation, Akron, Ohio, a corporation of Delaware No Drawing. Application April 29, 1950, Serial No. 159,154

26 Claims. (Cl. 260—326)

This invention relates to a new class of chemical compounds and to their preparation. More particularly, it relates to polyimido derivatives of polycarboxylic acids.

The compounds of the invention are valuable intermediates and find utility in the preparation of high polymeric materials by using the compounds to join or interlink molecules of moderate molecular weight to produce linear polymers of molecular weight sufficiently high to exhibit optimum physical properties or to convert thermoplastic polymers to thermosetting polymers.

The compounds may be called N-acyl polyimides of polycarboxylic acids. When derived from dicarboxylic acids, they may be called N-acyl bis imides and may be represented by the structural formula

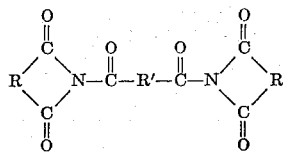

in which

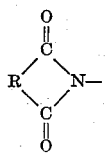

is an imido radical and

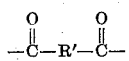

is a diacyl radical. More broadly, when the polycarboxylic acid has $x$ carboxyl groups, the products may be represented by the structural formula

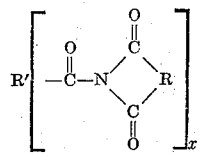

or

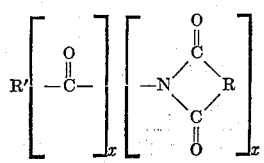

in which

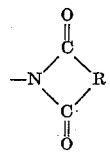

is an imido radical and

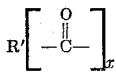

is a polyacyl radical and $x$ is 2 or more.

The compounds of the invention may be prepared by condensing a cyclic imide of a dicarboxylic acid, preferably in the form of its alkali metal salt, with the polyacyl chloride or polyacyl bromide of a polycarboxylic acid, the imide being used in such proportions as to replace each of the halogens in the acyl halide. The reaction may be illustrated by the following equation, employing potassium phthalimide and sebacyl chloride as representative reactants:

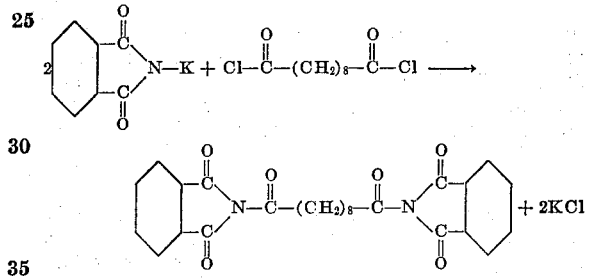

The preparation of the compounds is further illustrated by the following representative examples.

Example 1

Twenty-two and seven-tenths grams of potassium phthalimide and 63 cubic centimeters of dry xylene were placed in a three-neck flask equipped with a stirrer, dropping funnel and reflux condenser. Thirteen and ninety-one hundredths grams of sebacyl chloride (1 mol for 2 mols of the potassium phthalimide) were added gradually from the dropping funnel with stirring. The residuum in the dropping funnel was washed into the flask with 15 cubic centimeters of xylene. The mixture was warmed on a steam bath for 16 hours. A white solid separated from the mixture during the addition of the acid chloride and during the subsequent warming. The solid matter was filtered off and washed with xylene. It was dried in an oven, then slurried successively with 400 to 500 cubic centimeter portions of water. When potassium chloride had been removed from the product in this manner, the precipitate was dried. A nearly quantitative yield of about 25 grams of crude product was thus obtained. The purified product obtained on recrystallizing from dioxane melted at 181.5 to 183° C.

Analysis of a similar preparation with like melting point, which showed no mixed melting point depression with this product, gave 68.02% carbon and 5.38% hydrogen. The calculated values for the compound having the structural formula

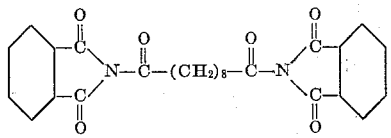

are 67.81% carbon and 5.24% hydrogen.

Example 2

Twenty-five and three-tenths grams of sebacyl chloride were added dropwise to 31.0 grams of potassium succinimide in 60 cubic centimeters of dry xylene contained in a three-neck flask equipped with a stirrer and reflux condenser. The mixture was heated and stirred for four hours. A voluminous white precipitate formed. It was filtered off, washed with xylene and dried in a vacuum oven. Potassium chloride was removed from the dried mixture by extracting it successively with three 400 cubic centimeter portions of distilled water. The solid product was filtered off and air dried. The yield of crude white product was about 25 to 30 grams. After recrystallization from acetic acid and then from a mixture of dioxane and ether, the melting point was 132 to 133° C.

Example 3

The procedure in Example 2 was followed. Ten and eight-tenths grams of isophthaloyl chloride and 15.0 grams of potassium succinimide were reacted in xylene. After washing the solid products with water to remove potassium chloride, 17 grams of a yellow, crude product were obtained. Recrystallization yielded a slightly yellow product, melting at 216 to 217° C. The melting point showed no increase on subsequent recrystallization.

Example 4

To 10.5 grams of succinimide (5% excess) in 50 milliliters of dry xylene were added, through a dropping funnel, 11.881 grams of sebacyl chloride. The funnel was rinsed down with an additional 20 milliliters of dry xylene and the mixture was warmed on a steam bath until the reaction began, as evidenced by the evolution of hydrogen chloride. Dry nitrogen was passed over the surface of the reaction to aid in removing the evolved hydrogen chloride. After the initial reaction had ceased, the mixture was heated on a steam bath for about three hours, until no more hydrogen chloride was evolved. On cooling, copious amounts of a white solid appeared. This was removed by filtration and thoroughly washed with water, leaving about 2 grams of a white insoluble powder. The powder was recrystallized from ethyl acetate and had a melting point of 130–131° C. A mixed melting point of this product with a sample of N,N'-sebacyl disuccinimide prepared by the reaction of potassium succinimide and sebacyl chloride gave only slight depression whereas the mixed melting point of this product with succinimide was 111° C.

Example 5

In a 500 milliliter round bottom flask fitted with a stirrer, condenser and powder funnel were placed 10.5 grams of phthalimide and 150 milliliters of pyridine. After solution of the phthalimide was complete, 7.1 grams of terephthaloyl chloride were slowly added and the solution was heated at reflux for 10 hours. On cooling, a solid precipitated, which was removed by filtration and thoroughly washed with water to remove pyridine hydrochloride. On recrystallization from diphenyl ether, the purified product melted with decomposition at 270–275° C.

Other compounds coming within the invention can be prepared by using other polyacyl chlorides and imides in place of those employed in the foregoing representative experimental examples.

Further representative examples of polyacyl chlorides are those corresponding to the following carboxylic acids: succinic, glutaric, adipic, pimelic, suberic, azelaic, brassylic, maleic, glutaconic, dihydracrylic, diglycollic, thiodiglycollic, alpha- and beta-hydromuconic; 1,2,4-hexanetricarboxylic; tricarballylic, aconitic, dimalonic, diphenic, phenylene diacetic, phenylene dipropionic, naphthalene diacetic, naphthalene dicarboxylic (the several forms), trimesic and 1,4,5,8-naphthalene tetracarboxylic acids as well as 2,2,6,6-tetra (beta-carboxyethyl) cyclohexanone; 1,2,3,3,4,5-hexa (beta-carboxyethyl) cyclopentadiene, bis [3,3,5,5-tetra (beta-carboxyethyl) cyclohexyl] and the various tetracarboxy diphenyls. Acyl chlorides of higher functionality can also be used. Corresponding polyacyl bromides can, if desired, be used. Acyl chlorides having a hydrocarbon nucleus are a preferred class. In addition to the parent compounds, compounds containing various substituents which are inert for the purposes of this invention can also be used.

Also, other imides can be employed in place of those shown in the preceding examples, the term "imide" being used as defined in Webster's International Dictionary and in accordance with Chemical Abstracts practice to signify compounds of the bivalent NH group with a bivalent acid radical. Further representative examples are oxalimide, malonimide, glutarimide, maleimide, naphthalimide; 2,3-naphthalene dicarboximide; 1,2-cyclohexanedicarboximide, and imides derived from the Diels-Alder condensation products of maleic anhydride. In addition to the parent compounds, one can also use imides containing substituents which are inert for the purposes of this invention, such as alkyl, aryl, aralkyl, alkoxy, aryloxy, chloro, nitro, cyano and like radicals.

Further representative examples of the N-acyl polyimides of the invention are N,N'-adipyl bis succinimide; N,N'-adipyl bis phthalimide; N,N'-isophthaloyl bis phthalimide; N,N'-terephthaloyl bis succinimide; N,N'-glutaryl bis malonimide; N,N'-glutaconyl bis oxalimide; N,N'-succinyl bis maleimide; N,N',N''-trimesyl tris glutarimide and the tetra oxalimido derivative of 1,4,5,8-naphthalene tetracarboxylic acid. The bis imides of dicarboxylic acids constitute a preferred class.

It is preferred to use the imides in the form of their alkali metal salts since the use of the free imides tends to give somewhat low yields and somewhat less pure products. When employing the free imides, the yield and purity may be improved by the addition of hydrogen chloride acceptors. Preferred examples of these well-known materials are pyridine, quinoline and tertiary amines. The hydrohalide of the acceptor, which is formed in this variation of the process, can be removed by exhaustive extraction with water.

In order to ensure complete conversion to the desired compound, and to minimize the problems of purification, it is desirable to use an amount of imide at least equivalent to the acyl groups present. An excess of the imide over the equivalent amount can be used, and is often desirable, but large excesses have the economic disadvantage that they must be removed from the product and recovered.

Although the products of the invention can be prepared in the absence of a solvent or diluent, it is preferred to use a dry, inert solvent. Suitable solvents are benzene, toluene, xylene and other alkylated aromatic solvent, various chlorinated aromatic solvents, various chlorinated aliphatic solvents such as chloroform, carbon tetrachloride and tetrachlorethane, and simple mixed or cyclic ethers. Certain hydrogen chloride acceptors can also be used as solvents, in which event an excess over the quantity required to absorb the hydrogen chloride is employed.

Reaction between the acid halide and imide (or alkali metal imide) in the presence of a diluent or solvent will take place at room temperature but rather slowly and therefore it is preferred to carry out the reaction at a moderate temperature. While the temperature is not particularly critical, temperatures in excess of 150° C. generally yield a more impure product. With a diluent whose normal boiling point is less than 150° C., it is advantageous to carry out the reaction at the reflux temperature since, with rapid stirring, the reaction is then very easily controlled.

I claim:

1. As a new compound, an N-acyl polyimide of a polycarboxylic acid in which each of the carbonyl groups of the acyl radical is attached to the nitrogen atom of an imido radical.

2. As a new compound, an N,N'-acyl bis imide of a dicarboxylic acid.

3. As a new compound, an N,N'-acyl bis succinimide of a dicarboxylic acid.

4. As a new compound, an N,N'-acyl bis phthalimide of a dicarboxylic acid.

5. As a new compound, an N,N'-acyl bis imide of an aromatic dicarboxylic acid.

6. As a new compound, an N,N'-acyl bis imide of an aliphatic dicarboxylic acid.

7. As a new compound, N,N'-isophthaloyl bis succinimide.

8. As a new compound, N,N'-isophthaloyl bis phthalimide.

9. A process for preparing a polyimide of a polycarboxylic acid which comprises condensing a compound selected from the group consisting of imides and N-alkali metal salts thereof with a polycarboxylic acid halide selected from the group consisting of chlorides and bromides, the imide compound being used in an amount at least equivalent to the acyl radicals in the acid halide.

10. A process according to claim 9 in which the imide is succinimide.

11. A process according to claim 9 in which the imide is phthalimide.

12. A process according to claim 9 in which the acid halide is terephthaloyl chloride.

13. A process according to claim 9 in which the acid halide is isophthaloyl chloride.

14. A process according to claim 9 in which the condensation is carried out in a dry, inert solvent.

15. A process for preparing a polyimide of a polycarboxylic acid which comprises condensing an alkali metal salt of an imide with an acyl chloride of a polycarboxylic acid, the alkali metal salt of the imide being used in an amount at least equivalent to the acyl radicals in the acyl chloride.

16. A process for preparing an N,N'-acyl bis imide which comprises condensing one mol of a dicarboxylic acid chloride with two mols of an imide.

17. A process for preparing an N,N'-acyl bis imide which comprises condensing one mol of a dicarboxylic acid chloride with two mols of an alkali metal salt of an imide.

18. A process for preparing an N-acyl imide which comprises condensing one mol of isophthaloyl chloride with two mols of potassium succinimide.

19. As a new compound, an N,N'-isophthaloyl bis imide.

20. As a new compound, an N,N'-terephthaloyl bis imide.

21. As a new compound, an N,N'-sebacyl bis imide.

22. As a new compound, an N,N'-adipyl bis imide.

23. As a new compound, N,N'-terephthaloyl bis phthalimide.

24. As a new compound, N,N'-sebacyl bis phthalimide.

25. As a new compound, N,N'-adipyl bis phthalimide.

26. A process for preparing a polyimide of a polycarboxylic acid which comprises condensing an imide with an acyl chloride of a polycarboxylic acid in the presence of a hydrogen chloride acceptor, the imide being used in an amount at least equivalent to the acyl radicals in the acyl chloride.

PAUL J. FLORY.

No references cited.